United States Patent
Partington et al.

(10) Patent No.: US 10,333,119 B2
(45) Date of Patent: Jun. 25, 2019

(54) FLAME ARRESTOR FOR A LEAD-ACID BATTERY

(75) Inventors: Ken Partington, Inglewhite (GB); Liam Warburton, Manchester (GB)

(73) Assignee: EH EUROPE GMBH, Zurich (CH)

(*) Notice: Subject to any disclaimer, the term of this patent is extended or adjusted under 35 U.S.C. 154(b) by 688 days.

(21) Appl. No.: 13/884,362

(22) PCT Filed: May 11, 2011

(86) PCT No.: PCT/EP2011/069912
§ 371 (c)(1),
(2), (4) Date: Jun. 18, 2013

(87) PCT Pub. No.: WO2012/062897
PCT Pub. Date: May 18, 2012

(65) Prior Publication Data
US 2013/0302656 A1    Nov. 14, 2013

(30) Foreign Application Priority Data
Nov. 11, 2010 (EP) .................................. 10190926

(51) Int. Cl.
*H01M 2/12* (2006.01)
*H01M 10/12* (2006.01)
*H01M 10/34* (2006.01)

(52) U.S. Cl.
CPC ......... *H01M 2/1205* (2013.01); *H01M 2/127* (2013.01); *H01M 10/121* (2013.01); *H01M 10/342* (2013.01)

(58) Field of Classification Search
CPC ............. H01M 10/121; H01M 10/342; H01M 2/1205; H01M 2/127; Y02E 60/126
See application file for complete search history.

(56) References Cited

U.S. PATENT DOCUMENTS

| 4,010,044 A | 3/1977 | Schaumburg |
| 4,315,058 A | 2/1982 | Schwendener et al. |

(Continued)

FOREIGN PATENT DOCUMENTS

| GB | 2050043 A | 12/1980 |
| WO | WO 03/043106 A1 | 5/2003 |

OTHER PUBLICATIONS

"Battery Vent and Flame Arrestor Plugs", (Product Application Data, Porvair Technology), PTL 16; Date unknown but believed earlier than (filing date of application).

(Continued)

*Primary Examiner* — Barbara L Gilliam
*Assistant Examiner* — Adam A Arciero
(74) *Attorney, Agent, or Firm* — Myers Bigel, P.A.

(57) ABSTRACT

A lead-acid battery comprises a flame arrestor plug (1) for controlled venting of gases from the battery through the vent hole (3), wherein the flame arrestor plug has a valve element (5) for controlling the venting of gas from the vent hole and a plug portion (4) which is adjacent to or in contact with the battery casing (2) around the vent hole and which, together with the battery casing, defines a flow path through which gases released through the valve element can escape from the battery, at least a portion of the flow path being of sufficiently narrow cross-section to prevent propagation of a flame along the flow path.

16 Claims, 4 Drawing Sheets

(56) References Cited

U.S. PATENT DOCUMENTS

| | | | |
|---|---|---|---|
| 4,851,305 A | 7/1989 | Kump et al. | |
| 6,254,841 B1* | 7/2001 | Kesper | H01M 2/127 |
| | | | 422/177 |
| 2007/0231677 A1* | 10/2007 | Stocchiero | H01M 2/08 |
| | | | 429/53 |
| 2008/0020267 A1* | 1/2008 | Aoki | H01M 2/043 |
| | | | 429/53 |
| 2010/0323228 A1* | 12/2010 | Okamoto | H01M 2/043 |
| | | | 429/82 |

OTHER PUBLICATIONS

"Flame Arrestors for Gas Sensor Protection" (Product Application Data, Porvair Technology), PTL 20, Date unknown but believed earlier than (filing date of application).

Huld, et al. Compilation of Existing Safety Data on Hydrogen and Comparative Fuels, (Project Report, European Integrated Hydrogen Project 2), Jul. 2001.

International Search Report for PCT/EP2011/069912 dated Feb. 24, 2012.

* cited by examiner

FLAME ARRESTOR FOR A LEAD-ACID BATTERY

CROSS-REFERENCE TO RELATED APPLICATION

This application is a 35 U.S.C. § 371 national phase application of International Application Serial No. PCT/EP2011/069912, filed Nov. 11, 2011, which claims priority to European Patent Application No. 10190926.5, filed Nov. 11, 2010, the contents of each of which are incorporated by reference herein in their entireties. The above PCT International Application was published in the English language and has International Publication No. WO 2012/062897.

In VRLA (Valve Regulated Lead-Acid) batteries hydrogen (predominantly) and oxygen build up within the battery containers and need to be vented to atmosphere. At the same time, the battery container needs to be sealed to prevent the ingress of oxygen. That is achieved by using a vent which releases the gas at a predetermined pressure and closes against a positive pressure. Those battery vents generally consist of a neoprene or EPDM (Ethylene Propylene Diene Monomer) valve, typically of a Bunsen or flap valve design.

It is possible that, during the operation of the vent, an external spark could ignite the gas and travel through the vent to the inside of the battery. If this happened the gas within the battery could ignite causing a potentially harmful explosion. Flame arrestors are increasingly fitted above VRLA battery vents to prevent this happening. Those flame arresting discs, typically 3 mm in thickness, are usually of a sintered construction of either a ceramic or polyethylene/polypropylene material. Those flame arrestors work by diffusing gas and providing a torturous path to prevent an external flame from passing through the disc to the inside of the battery.

In addition to those parts a plastic disc is typically fitted over the flame arrestor to keep it clean and help keep the vent and flame arrestor in place. Each of those three parts is often fitted to each cell of a battery such that a 12V battery requires eighteen parts to be fitted.

It is possible to purchase assemblies of two or three of those components, which sometimes include an additional plastic housing and seal. That makes the parts easier and/or faster to fit but the assembly typically costs more than the individual items and therefore increases the material cost of the finished battery.

U.S. 2007/0231677 A1 discloses a battery having a vent system in which there is a flexible rubber cap placed over the end of a vent tube. The cap is flexible and, when under pressure from gas build up inside the battery, deforms to open up a leak path between its own inner surface and the outside surface of the vent tube, through which the gases can vent to the exterior of the battery. The design of the vent system is simple. However, under conditions of rapid gas build up it may be possible for the flexible cap to be deformed to an extent which would create a leak path wider than the quench gap for a hydrogen flame, thereby opening up the possibility of a flame travelling into the inside of the battery.

There is therefore a need for an improved flame arrestor arrangement for lead-acid batteries.

The present invention provides a lead-acid battery comprising a casing having at least one vent hole, and at least one flame arrestor plug for controlled venting of gases from the battery through the at least one vent hole, wherein the or each flame arrestor plug is associated with a vent hole and has a valve element for controlling the venting of gas from that vent hole and a plug portion which is adjacent to or in contact with the battery casing around the vent hole and which, together with the battery casing, defines a flow path through which gases released through the valve element can escape from the battery, at least a portion of the flow path being of sufficiently narrow cross-section to prevent propagation of a flame along the flow path.

In a favoured embodiment, the present invention provides a lead-acid battery comprising a casing having at least one vent hole, and at least one flame arrestor plug for controlled venting of gases from the battery through the at least one vent hole, wherein the or each flame arrestor plug is associated with a vent hole and has a valve element for controlling the venting of gas from that vent hole and a plug portion which is in contact with the battery casing around the vent hole and which, together with the battery casing, defines one or more channels through which gases released through the valve element can escape from the battery, at least a portion of the or each channel being of sufficiently narrow cross-section to prevent propagation of a flame along the channel.

As gas builds up in the battery during use, the pressure inside the battery increases until a point is reached at which the pressure is sufficient to cause the valve element of the flame arrestor plug to open. When the valve element opens gas is released through the vent hole and through the valve element and escapes to the outside of the battery through the flow path, for example, the channel or channels which is or are defined between the battery casing and the plug portion of the flame arrestor plug. The combination of a valve element for controlling the venting of the gas and a plug portion which, together with the battery casing, defines a flow path though which the gases can escape from the battery whilst at the same time preventing propagation of the flame back along the flow path, has the advantage that only one part (the flame arrestor plug) needs to be provided for each vent hole on the battery, thereby reducing the complexity of the assembly process and in many cases helping to reduce the overall cost of the battery.

The flame arrestor plug contains two essential components, the first being the valve element which controls the venting of the gas from the vent hole and the second being a plug portion which is adjacent to or in contact with a part of a surface of the battery casing and, together with the battery casing, defines a flow path, for example, having one or more channels through which the gas released through the valve element can escape from the battery. The flow path is too small for a flame to pass through. In the embodiment where the flow path consists of one or more channels, the channel or channels are each sized such that they are too small for a flame to pass through. In this way, the flame arrestor plug of the invention combines in a single component the two functions of the control of the venting gases and the prevention of flame propagation.

Preferably, the flame arrestor plug is moulded as a single piece. In a preferred embodiment the flame arrestor plug is made by injection moulding. Injection moulding allows the rapid manufacture of the flame arrestor plugs at relatively low cost. The present inventor has found that it is possible to make some embodiments of the flame arrestor plug of the present invention using a single opening mould in an injection moulding process. More complex shapes of flame arrestor plug are available via the use of other moulds such as double-opening moulds and are within the scope of the invention, but use of a double-opening mould adds costs as compared to a single opening mould.

In order for the flame arrestor plug to be efficiently fitted into the casing during assembly of the battery, it must have some rigidity. However, the valve element of the flame arrestor plug needs to be sufficiently soft and flexible to allow it to be forced open by the pressure of a gas within the battery. Optionally, the flame arrestor plug is of a thermoplastic vulcanizate material, for example, an ethylene-propylene-diene-monomer (EPDM) material. Optionally, the material will have a hardness in the region of from 60 to 95 Shore A, preferably, from 70 to 93 Shore A, as measured according to ISO 868. For example, the material may be a EPDM polypropylene vulcanizate. The inventor has found that such materials may provide the right balance of rigidity and flexibility. One suitable material is Enflex VU-420-90A available from Enplast of Turkey.

The flow path, for example, the one or more channels located between and defined by the plug portion of the flame arrestor and the surface of the casing should be of sufficient size so that it or they can handle the projected maximum possible flow of gas from the battery. Of course, the flow path or each individual channel should be so sized that at least along part of its length its internal dimensions are less than the quenching gap of a hydrogen flame so that, if hydrogen is vented from the battery and is ignited by a spark or other source of combustion on the outside of the battery, the flame will not be able to travel back down the channel into the interior of the battery. The concept of the quenching gap is well known in combustion science and relates to the distance from the wall of whatever container holds the flame in which the flame extinguishes due to heat losses. If a dimension of a passage or channel is less than a particular width, the flame front is extinguished because heat transfer and/or chemical quenching of the flame by the wall become great enough to prevent the flame propagating. The quenching gap is therefore the largest passage that can prevent propagation of a flame through that passage when it is filled with a flammable hydrogen/air mixture. The quenching gap will depend to some extent upon the concentration of hydrogen, the temperature, pressure and the geometry of the inside of the channel and the skilled person will be aware of the relevance of such factors and their relevance to the design of known flame arrestors.

The flow path may be of any suitable form which can allow the gas flow to escape and which will prevent flame propagation. Preferably, the flow path consists of one or more channels. Preferably, the plug portion and the battery casing will define more than one channel in order to increase the gas flow capacity of the channels as a whole and in order to build in a redundancy in the event that one or more of the channels becomes blocked during usage of the battery. Optionally, there are from 5 to 100 channels, for example, from 20 to 70 channels. Preferably, the or each channel has a cross-section which is no more than 0.6 mm across in any direction. The channel or channels may be of any suitable length, for example, from 2 mm to 20 mm, preferably from 3 mm to 10 mm long. The channels may have a cross-section which is no more 0.6 mm across in any direction over all of their length, or in another embodiment the or each channel may have a cross-section which is no more than 0.6 mm across in any direction over only part of its length. The length of the channel over which the cross-section is less than the quenching gap of hydrogen should be sufficient to ensure that the flames cannot propagate down the channel. The one or more channels optionally each have along at least 1 mm, optionally, at least 2 mm and in another embodiment, at least 4 mm of its length, a cross-section which is no more than 0.6 mm across in any direction. The battery will preferably be free of any leak paths for hydrogen by means of which hydrogen can escape from the battery without passing through the one or more channels.

The channel or channels are formed in the interface region where the plug portion of the flame arrestor plug is adjacent to or is in contact with the surface of the casing. In one embodiment, the plug portion of the flame arrestor plug or the surface of the casing in the region when it contacts the plug portion or both is or are provided with one or more grooves, each groove defining in part a channel. Preferably, the plug portion of the flame arrestor plug is provided with one or more grooves which, together with the battery casing, define the one or more channels. In the case where there is a plurality of grooves provided on the outer surface of the plug portion, for example, 20 or more grooves, the grooving of the surface of the plug portion allows the plug portion to be more easily fitted into the battery casing because the grooved surface is slightly more compressible. Furthermore, in the embodiment where grooves are present on the plug portion of the flame arrestor plug, the flame arrestor plug of the present invention can be fitted to conventional battery casings having no grooves, in some cases with no need for modification of the existing battery casing. Moreover, it will, in general, be easier and less costly to mould the grooves on the flame arrestor plug than to mould them into the battery casing which will, by its nature, be generally a larger and more complex moulding.

The grooves can be of any suitable configuration, for example, they can be straight or curved.

Optionally, the plug is sized such that a channel in the form of a gap is defined between the plug and the surface of the battery casing, the gap being of sufficiently narrow cross-section to prevent flame propagating along it. In that embodiment, the flow path will be in the form of an annular-shaped gap. Preferably, the gap between the plug portion and the surface of the casing is no wider than 0.6 mm. In that embodiment, and where the surface of the plug is provided with grooves, the plug may be so sized that the ridges defined between the grooves do not make contact with the battery casing, or only make contact with the battery casing over a portion of their length. For example, there may be a gap having a width of up to 0.1 mm between the ridges and the inner walls of a recess in the battery casing in which the plug is fitted.

It will be appreciated that although the material of the flame arrestor plug portion typically has some degree of softness and resilience it will not be so soft that the flow path, for example, the one or more channels are closed up by the forces applied between the battery casing and the plug portion and therefore the flow path, for example, the one or more channels, will be of a well defined size and shape, in contrast to some known flame arrestor systems such as that described in U.S. 2007/0231677 A1 in which a leak path is opened up by the pressure of the gas inside the battery and the size of the leak path is therefore dependent to some extent on the level of gas flow from the battery.

The plug portion of the flame arrestor plug may of any suitable shape. In one embodiment the plug portion is of circular cross-section and in that embodiment one or more grooves are preferably formed in the peripheral outer surface of the plug portion. Advantageously, the plug portion is provided with at least one flat face to which force can easily be applied by an operator or by an assembly machine to force the plug into a recess in the battery casing during the assembly of the battery.

The plug portion may have as its sole function the defining, with the battery casing, of the flow path for the escape of gas emitted through the vent hole and valve element. However, in a favoured embodiment the plug portion also has the function of fitting within a recess within the battery casing in such a way to assist in holding the flame arrestor plug in place over the vent hole. Optionally, the or each vent hole is formed in the bottom of a recess in the casing and the plug portion of the flame arrestor plug is received within the recess. Preferably, the plug portion of each flame arrestor plug is press fitted into a recess in the casing of the battery. Optionally, each recess has a slight inverse taper such that it is wider towards the interior of the battery than it is at the end closest to the exterior of the battery, thereby further helping to hold the plug portion in place.

Advantageously, the plug portion has a circular cross-section and has a diameter in the region of from 5 to 20 mm, preferably from 6 to 20 mm.

The valve element can be of any suitable form, for example, a Bunsen valve or a flap valve. Typically the valve element will be designed such that when the excess pressure of the battery reaches a certain level the valve will open, thereby allowing gas to escape from the battery though the valve element and then via the flow path to the outside of the battery. Optionally, the valve element is designed to open at an excess pressure of greater than 1 psi, for example, in the range of from 1.1 to 10 psi, optionally from 1.2 to 8 psi.

In one embodiment the valve element is a flexible member which contacts the casing around the vent hole to form a flexible seal over the vent hole. The flexible member may extend directly from the plug portion of the flame arrestor plug or may be connected to the plug portion by some intermediate stem or other member. Optionally, the flexible member extends directly from the plug portion. Optionally, the valve element is a flexible skirt which extends from the plug portion. Optionally, the flexible skirt is of generally truncated conical form. In another embodiment the flexible skirt is cup-shaped and forms a dome shape over the hole. Optionally, the thickness of the skirt reduces along its length in a direction away from the plug portion, that is, the skirt tapers along its length so that it is more flexible at the end where it contacts the casing around the vent hole. Alternatively, the skirt may be of approximately constant thickness along its length. As gas pressure builds up inside the battery the excess pressure will eventually cause the flexible member, for example, the skirt, to deform and lift away from the casing around the vent hole thereby forming a gap through which the gas can escape from the vent.

Optionally, the or each flame arrestor plug further comprises a member which extends into the interior of the battery through the vent hole and which is a push fit in the vent hole, thereby helping to retain the plug in location over the vent hole. Accordingly, the or each flame arrestor plug also includes a retention member which extends from the flame arrestor plug through the associated vent hole and contacts the inner wall of the vent hole, thereby helping to retain the flame arrestor plug in position. The retention member can be of any suitable form but of course should be so shaped that when fitted in place it does not completely block a vent hole and prevent escape of gas from the vent hole. Accordingly therefore the retention member will generally have a cross-section which differs from the shape of the vent hole. Optionally, the retention member has an end which is at least partially tapered in order to assist the location of the retention member in the vent hole.

The invention also provides a flame arrestor plug for a lead-acid battery which includes a valve element for controlling the venting of gas from a vent hole in the lead-acid battery and a plug portion which is provided on an outer surface thereof with one or more grooves. Advantageously, over at least 1 mm of its length the or each groove has a depth of no more than 0.6 mm. Preferably, the flame arrestor plug is provided with a plurality of grooves. Preferably, the or each groove has a length of at least 6 mm and a depth of no more than 0.6 mm. Optionally, the flame arrestor plug further includes a retention member sized and shaped to fit within the vent hole of the lead-acid battery thereby helping to retain the plug in place over the vent hole.

The present invention is applicable to any type of lead-acid battery from which hydrogen in generated. Optionally, the battery is a valve regulated lead-acid (VRLA) battery. Optionally, the battery is a multi-cell battery, for example, a 12 V battery. The battery casing may be of any suitable form.

Optionally, the casing comprises a lid and in one embodiment the or each vent hole is in the lid.

Generally, each cell of the battery will be provided with at least one vent hole. The vent holes may also be used as acid filling holes during manufacture of the battery.

Several embodiments of the invention will now be described in more detail, for the purpose of illustration only with reference to the following drawings in which.

Figure 1:
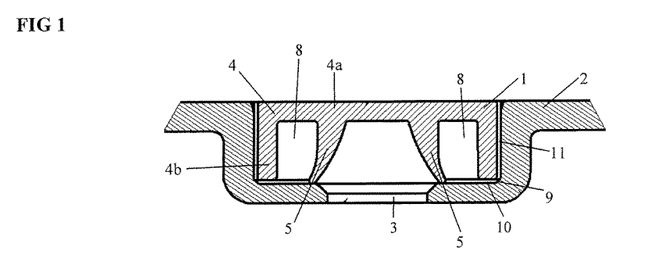
FIG. 1 is a cross-section through a part of a battery casing and flame arrestor plug according to the invention.

FIG. 1 shows a flame arrestor plug 1 according to a first embodiment of the invention. The flame arrestor plug 1 is tightly fitted within a cylindrical recess in the lid of a battery casing 2 (shown only in part in FIG. 1) of a lead-acid battery. The casing 2 includes vent hole 3 which is also used as an acid fill hole during manufacture of the battery.

The flame arrestor plug 1 comprises a plug portion 4 which includes a generally circular portion 4a and a generally annular portion 4b which extends from the lower face of the circular portion 4a. The flame arrestor plug 1 also includes a valve element 5 which extends directly from the lower face of circular portion 4a of plug portion 4 and is in the form of a skirt having an approximately truncated conical form. As shown in FIG. 1, the valve element 5 tapers along its length so that it is thinner and more flexible at the end where it contacts the battery casing 2 around the vent hole 3.

Figure 2:
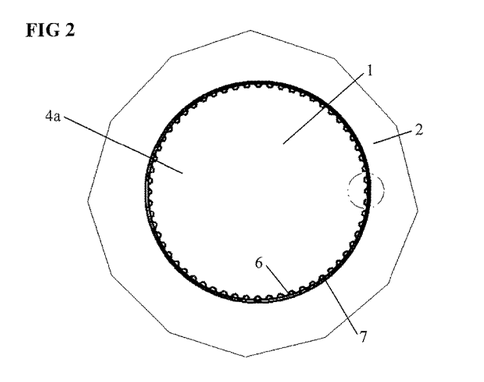
FIG. 2 shows a view from above of the portion of the battery casing and flame arrestor plug of FIG. 1.
Figure 2A:
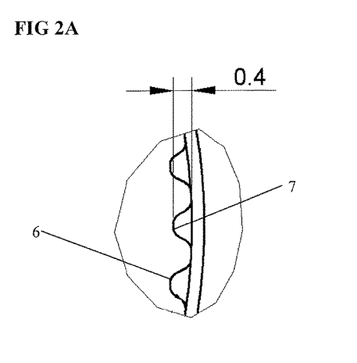
FIG. 2a shows on a larger scale some detail of FIG. 2.
Figure 3:
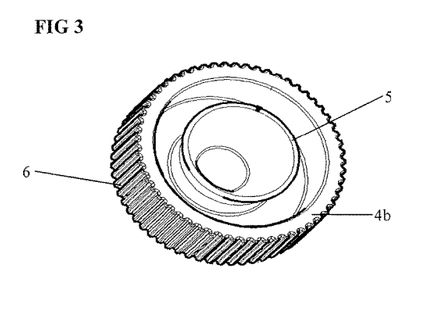
FIG. 3 is a perspective view from underneath and to the side of the flame arrestor plug of FIG. 1.
Figure 4:
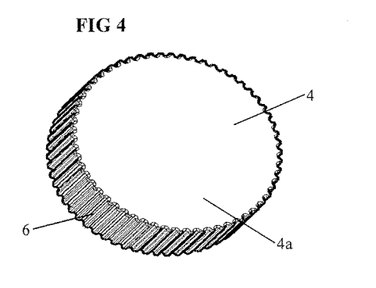
FIG. 4 is a perspective view from above and to the side of flame arrestor plug of FIG. 1.

As shown in FIGS. 2, 2a, 3 and 4, the outer peripheral surface of the annular portion 4b of the flame arrestor plug 1 is provided with a plurality of grooves 6 which extend longitudinally along the length of annular portion 4b in a direction parallel to the axis of the annular portion 4b. As can be seen in FIGS. 2 and 2a, the grooves 6 together with the inside wall of the recess in the battery casing 2 in which the flame arresting plug is fitted define a flow path in the form of a plurality of channels 7 through which gas emitted through the vent hole 3 and through the valve element 5 can escape from the interior of the battery to the exterior of the battery. The grooves 6 are 0.4 mm deep and therefore channels 7 have a cross-section which is also approximately 0.4 mm across.

The casing lid 2 is made from a conventional material such as polypropylene, ABS or an ABS alloy. The flame arrestor plug 1 is made as one piece by injection moulding of an EPDM polypropylene resin. The EPDM polypropylene resin has sufficient flexibility to allow the flame arrestor plug 1 to be fitted into place by an operator applying force by hand to the circular upper face of the circular portion 4a, thereby driving it into the recess in the lid. The flexibility of the material together with the tapered form of the valve elements 5 allows that valve element to deform under pressure of gas building up inside the battery so that valve element 5 will lift away from the casing 2 to allow the gases to escape into the space 8, which is between the valve element 5 and the annular portion 4b of the plug portion 4. The casing is moulded with a small chamfer 9 between the floor 10 and the side wall 11 of the recess in the casing 2. That chamfer 9 prevents the annular portion 4b of the plug portion 4 being driven so far into the recess so that it meets the floor 10 of the recess. A gap of 0.4 mm is present between the lower extremity of annular portion 4b and the floor 10 of the recess in the casing 2 so that hydrogen in space 8 can flow through to channels 7 and escape from the battery through those channels.

Figure 5:
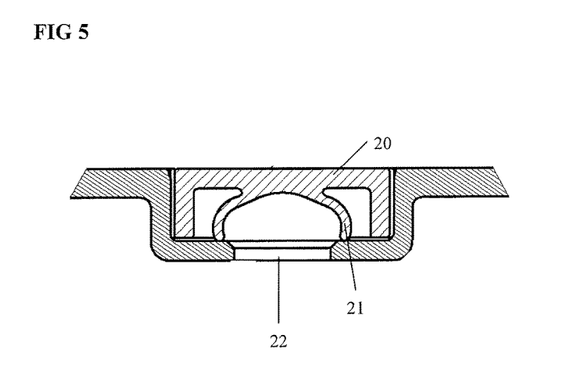
FIG. 5 shows a partial section through a battery casing and a flame arrestor plug according to a second embodiment of the invention.
Figure 6:
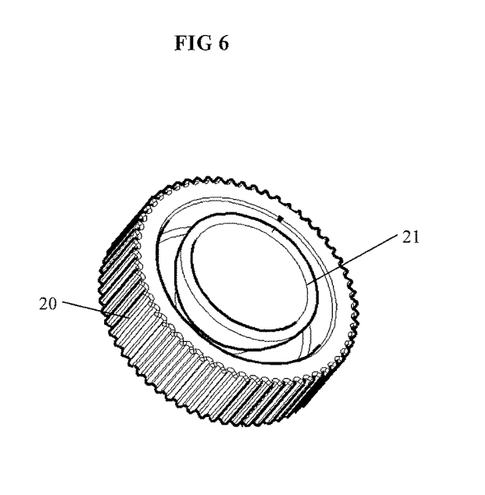
FIG. 6 shows a perspective view from below and to the side of the flame arrestor plug of FIG. 5.
Figure 7:
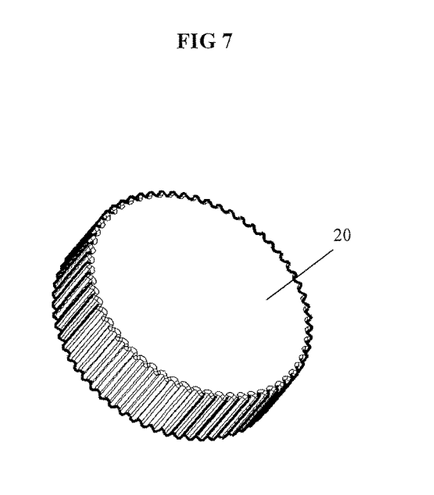
FIG. 7 shows a perspective view from above and to the side of the flame arrestor plug of FIG. 5.

FIGS. 5 to 7 show a flame arrestor plug 20 according to a second embodiment of the invention which is generally similar to the flame arresting plug of FIG. 1 except that the valve element 21 is not tapered and is instead of approximately uniform thickness along its length. As shown in FIG. 6 the valve element 21 is cup-shaped such that it forms a dome shape over the vent hole 22.

Figure 8:
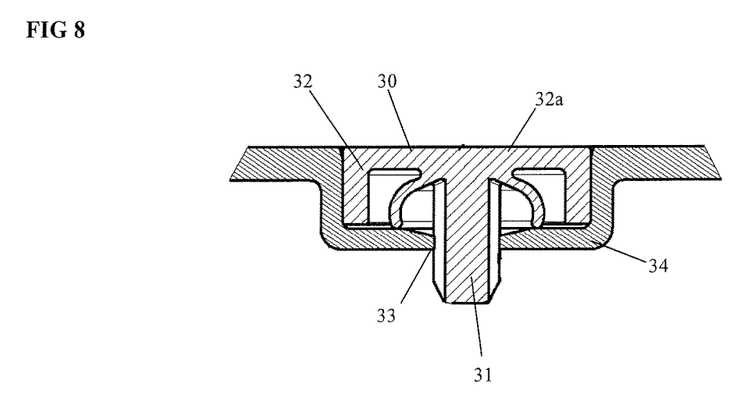
FIG. 8 shows a partial cross-section through a battery casing and though a flame arrestor plug according to a third embodiment of the invention.
Figure 9:
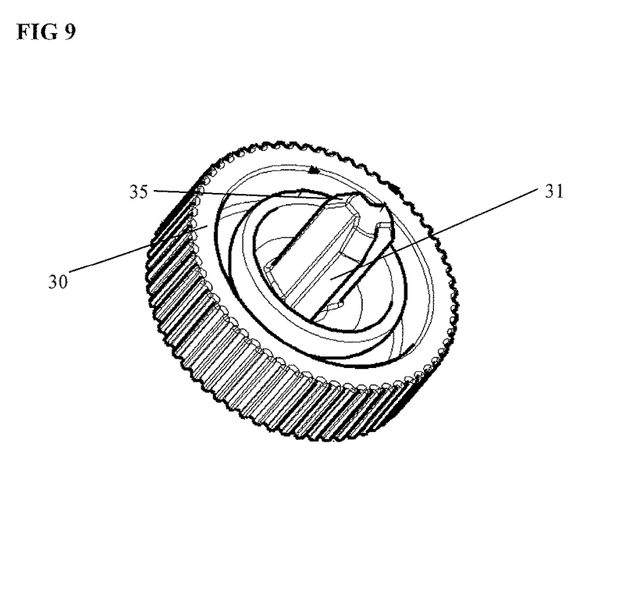
FIG. 9 shows a perspective view from below and to the side of the flame arrestor plug of FIG. 8.

FIGS. 8 and 9 show a flame arrestor plug 30 according to a third embodiment of the invention which is generally similar to the flame arresting plug shown in FIGS. 5 to 7 except that the flame arresting plug includes a retention member 31 in the form of a three-lobed stem which extends from the central portion of the circular portion 32a of plug portion 32 of the flame arrestor plug through the vent hole 33. As shown in FIG. 8, the lobes of the stem 31 contact the casing 34 at the periphery of the vent hole 33, thereby also helping to locate and retain the flame arrestor plug 30 in place in the casing 34.

It will be appreciated that the three lobes of the retention member 31 together with the casing 34 at the periphery of the vent hole 33 together define three generally triangular channels through which gas can flow through the vent hole 33. As shown in FIG. 9, the end of the retention stem 30 has a tapered portion 35 for easier fitting of the retention member into the vent hole 33.

Figure 10:
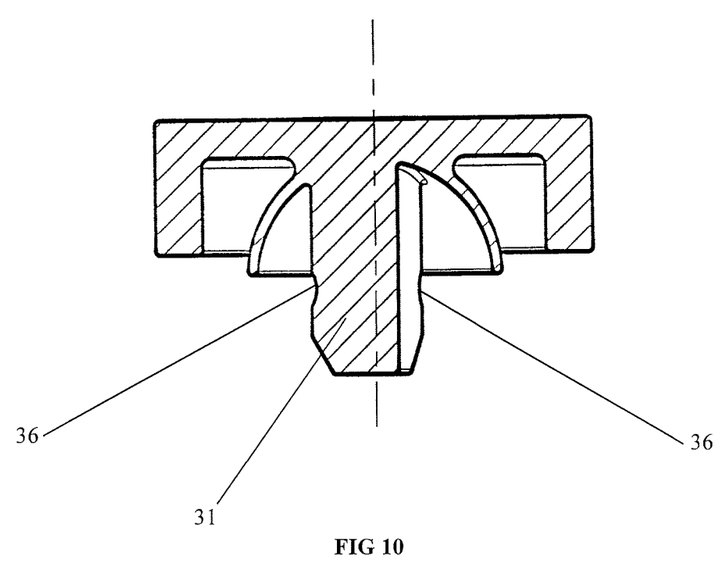
FIG. 10 shows a modified form of flame arrestor plug.

FIG. 10 shows a modified form of flame arrestor plug in which each of the three lobes of the retention member 31 is provided with a notch 36, which engages with the battery casing at the periphery of the vent hole to further assist in holding the plug in place in that vent hole.

It will be appreciated that the retention member 31 may suffice to retain the plug in the vent hole 33 so that there is no need for the plug portion 32 to be a push fit into the recess in the casing 34. In some embodiments, therefore, it may be preferred for the plug portion 32 to be smaller in diameter than the recess, so that there exists a gap of, say, up to 0.1 mm between tips of the areas (ridges) of the plug between the grooves and the inner wall of the recess, so that the plug portion does not contact that inner wall, or contacts it only at the bottom of the recess if the recess is chamfered as shown at reference numeral 9 in FIG. 1. In that embodiment, the flow path for the escape of the gas is in the form of a gap extending around the periphery of the plug portion 32 between the plug portion 32 and the casing 34. The gap is generally annulus-shaped.

As is apparent from the foregoing general description and the specific embodiments, to all forms of the invention herein illustrated and described, various modifications can be made without departing from the sprit and scope of the invention. Accordingly, it is not intended that the invention be limited thereby.

The invention claimed is:

1. A flame arrestor plug for a lead-acid battery which includes a valve element for controlling the venting of gas from a vent hole in a casing of the lead-acid battery, and a plug portion which is provided in an outer surface thereof with one or more grooves, which, in use, together with the battery casing define one or more channels between the plug and the battery casing through which gases released through the valve element can escape from the battery, wherein at least a portion of the or each channel has a cross-section that is sized and configured to prevent propagation of a flame along the channel, and wherein the plug portion comprises an annular portion and the one or more grooves extend longitudinally along an entire length of the annular portion.

2. A flame arrestor plug as claimed in claim 1 in which the or each groove has a depth of no more than 0.6 mm over at least 1 mm of its length.

3. A flame arrestor plug as claimed in claim 1 in which the or each groove has a length of at least 6 mm, and a depth of no more than 0.6 mm.

4. A lead-acid battery comprising a casing having at least one vent hole, and at least one flame arrestor plug for controlled venting of gases from the battery through the at least one vent hole,
    wherein the or each flame arrestor plug is associated with a vent hole and has a valve element for controlling the venting of gas from that vent hole and a plug portion which is adjacent to or in contact with the battery casing around the vent hole and which, together with the battery casing, defines a flow path between the plug and the battery casing through which gases released through the valve element can escape from the battery, at least a portion of the flow path having a cross-section that is sized and configured to prevent propagation of a flame along the flow path,
    wherein the flow path consists of 20 or more channels defined by the battery casing together with 20 or more corresponding grooves provided on an outer surface of the plug portion of the flame arrestor plug.

5. A flame arrestor plug as claimed in claim 1 in which the outer surface is an annular outer surface.

6. A lead-acid battery as claimed in claim 4 in which the outer surface is an annular outer surface.

7. A lead-acid battery as claimed in claim 4 in which the flame arrestor plug is moulded from an ethylene-propylene-diene-monomer (EPDM) polymer.

8. A lead-acid battery as claimed in claim 4 in which the flame arrestor plug is of a material having a Shore A hardness of from 60 to 90.

9. A lead-acid battery as claimed in claim 4 in which the channels each have, along at least 1 mm of their length, a cross-section which is no more than 0.6 mm across in any direction.

10. A lead-acid battery as claimed in claim 4 in which the valve element is a flexible member which contacts the casing around the vent hole to form a flexible seal over the vent hole.

11. A lead-acid battery as claimed in claim 10 in which the valve element is a flexible skirt which extends from the plug portion.

12. A lead-acid battery as claimed in claim 11 in which the thickness of the skirt reduces along its length in a direction away from the plug portion.

13. A lead-acid battery as claimed in claim 10 in which the valve element forms a dome shape over the vent hole.

14. A lead-acid battery as claimed in claim 4 in which the or each vent hole is located in a recess in the casing, and the plug portion of the flame arrestor plug associated with the or each vent hole is a push fit into the recess.

15. A lead-acid battery as claimed in claim 4 in which the or each flame arrestor plug also includes a retention member which extends from the flame arrestor plug through the associated vent hole and contacts the inner wall of the vent hole, thereby helping to retain the flame arrestor plug in position.

16. A lead-acid battery as claimed in claim 4 in which the plug portion comprises an annular portion and the grooves extend longitudinally along a length of the annular portion.

\* \* \* \* \*

UNITED STATES PATENT AND TRADEMARK OFFICE
CERTIFICATE OF CORRECTION

PATENT NO. : 10,333,119 B2
APPLICATION NO. : 13/884362
DATED : June 25, 2019
INVENTOR(S) : Partington et al.

Page 1 of 1

It is certified that error appears in the above-identified patent and that said Letters Patent is hereby corrected as shown below:

On the Title Page

Item (22) PCT Filed:
Please correct "May 11, 2011" to read -- November 11, 2011 --

Signed and Sealed this
Twenty-second Day of October, 2019

Andrei Iancu
*Director of the United States Patent and Trademark Office*